US010380097B1

(12) United States Patent
Walters

(10) Patent No.: US 10,380,097 B1
(45) Date of Patent: Aug. 13, 2019

(54) PHYSIOLOGICAL-BASED DETECTION AND TAGGING IN COMMUNICATIONS DATA

(71) Applicant: Securus Technologies, Inc., Dallas, TX (US)

(72) Inventor: Arthur P. Walters, McKinney, TX (US)

(73) Assignee: Securus Technologies, Inc., Carrollton, TX (US)

( * ) Notice: Subject to any disclaimer, the term of this patent is extended or adjusted under 35 U.S.C. 154(b) by 634 days.

(21) Appl. No.: 14/973,171

(22) Filed: Dec. 17, 2015

(51) Int. Cl.
*G06F 16/23* (2019.01)
*G06F 16/22* (2019.01)
*G06F 16/61* (2019.01)
*G06F 16/71* (2019.01)
*G06F 16/68* (2019.01)
*G06F 16/783* (2019.01)
*G06F 16/951* (2019.01)

(52) U.S. Cl.
CPC .......... *G06F 16/2358* (2019.01); *G06F 16/22* (2019.01); *G06F 16/61* (2019.01); *G06F 16/686* (2019.01); *G06F 16/71* (2019.01); *G06F 16/784* (2019.01); *G06F 16/951* (2019.01)

(58) Field of Classification Search
CPC combination set(s) only.
See application file for complete search history.

(56) References Cited

U.S. PATENT DOCUMENTS

| 5,204,670 A * | 4/1993 | Stinton ................ A61B 5/0531 340/10.5 |
| 8,965,090 B1 | 2/2015 | Khachaturian et al. |
| 2009/0023428 A1* | 1/2009 | Behzad ............. G06F 17/30032 455/414.3 |
| 2014/0282011 A1* | 9/2014 | Dellinger .............. G06F 3/0482 715/731 |
| 2014/0297217 A1* | 10/2014 | Yuen ..................... G01B 21/16 702/138 |

* cited by examiner

*Primary Examiner* — Shyue Jiunn Hwa
(74) *Attorney, Agent, or Firm* — Fogarty LLP

(57) ABSTRACT

Systems and methods for detecting changes in physiological indicators in communications data of participants of a communication and tagging those changes are described. According to an embodiment, a method uses an analytics module operating on at least one processor. Data indicative of a communication between participants is received. A physiological indicator of at least one of the participants is detected by analyzing the data. A change in the physiological indicator is determined in the data. A location of the data where the change in the physiological indicator occurred in the data is tagged. The tagging includes storing a tag indicating the location of the data where the change in physiological indicator occurred in memory.

20 Claims, 2 Drawing Sheets

PHYSIOLOGICAL-BASED DETECTION AND TAGGING IN COMMUNICATIONS DATA

TECHNICAL FIELD

The present disclosure relates generally to tagging a possible event in communications data (e.g., video and/or audio data), and more particularly to detecting a change of a physiological indicator of a participant to a communication and within video and/or audio data and tagging the video and/or audio data to indicate when the change occurred.

BACKGROUND

Throughout the criminal justice process, there may be many instances where an inmate or suspect will communicate with another person, such as an investigator, a family member, a friend, etc., where that communication will be observed by authorities. These communications can be in-person communications, such as an interrogation during an investigation, a face-to-face visit with a family member, friend, etc., or the like, or can be by video conferencing. In many instances, the communications are observed by authorities, and the communications can be recorded. The recordings can be probative for future investigations.

By recording interrogations, investigators may have the ability to review the recording to identify any stated information that was missed or overlooked well after the interrogation occurred. For example, some information stated by the person being interviewed may appear to be irrelevant at the time of the interrogation, but later in the investigation, the information may become highly material. Additionally, recordings of interrogations may be important forensic evidence used at trial, for example, when the person being questioned admits to a material fact.

Communications between an inmate and someone outside of the correctional facility, such as family and friends, are thought to be beneficial to facilitate the inmate's transition back into society upon release. As mentioned above, the forms of these communications can include in-person visitation and individual-to-individual videoconferences. Although these forms of communications are intended to be beneficial for the inmate's transition back to society, these communications can be used to direct or communicate instructions relating to illicit activities. For example, an inmate could direct someone to destroy evidence, intimidate a witness, perform revenge, or continue an illegal operation.

Recordings of communications can be a valuable tool during investigations. They can be used as proof of material facts or as cross-checking of different accounts of events. Further, recordings can provide insight into activities of which the authorities were not previously aware, which can allow authorities to investigate those activities.

SUMMARY

The present disclosure is directed to systems and methods which detect in video and/or audio data a change in a physiological indicator of a participant in a communication captured by the video and/or audio data, and which store the video and/or audio data and a tag indicating where the change in the physiological indicator occurred in the video and/or audio data in a database. This information can be used in real-time to, for example, aid in effective interrogation, or can be subsequently used to more efficiently investigate matters or to provide for more effective data mining.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processor, wherein the memory is configured to store program instructions executable by the processor to cause the system(s) to execute one or more operations disclosed herein.

An embodiment is a method. The method uses an analytics module operating on at least one processor. Data indicative of a communication between participants is received. A physiological indicator of at least one of the participants is detected by analyzing the data. A change in the physiological indicator is determined in the data. A location of the data where the change in the physiological indicator occurred in the data is tagged. The tagging includes storing a tag indicating the location of the data where the change in physiological indicator occurred in memory.

Another embodiment is a system. The system includes a database device and an analytics system. The database device has a database management system operable on at least one processor and has a database memory for storing a database. The analytics system has an analytics module operable on at least one processor. The analytics system is operatively coupled to the database device. The analytics module is operable to receive communications data representative of a communication between at least two participants, and the communications data includes video data, audio data, or a combination thereof. The analytics module is further operable to identify a physiological indicator of at least one of the participants in the communications data, operable to determine a change in the physiological indicator in the communications data, and operable to transmit a tag to the database device. The tag indicates a location in the communications data where the change in the physiological indicator occurred. The database management system is operable to store the communications data and the tag in the database memory.

A further embodiment is a non-transitory computer-readable storage medium having a computer program embodied thereon. The computer program comprises program code instructions for detecting a physiological indicator in communications data, the communications data being representative of a communication between at least two participants, the physiological indicator being of at least one of the participants, the communications data including video data, audio data, or a combination thereof; program code instructions for determining a change in the physiological indicator in the communications data; and program code instructions for storing the communications data and a tag to memory, the tag indicating a location in the communications data where the change in physiological indicator occurred.

The foregoing has outlined rather broadly the features and technical advantages of the present embodiments in order that the detailed description that follows may be better understood. Additional features and advantages will be described hereinafter which form the subject of the claims of the invention. It should be appreciated that the conception and specific embodiments disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Figure 1:
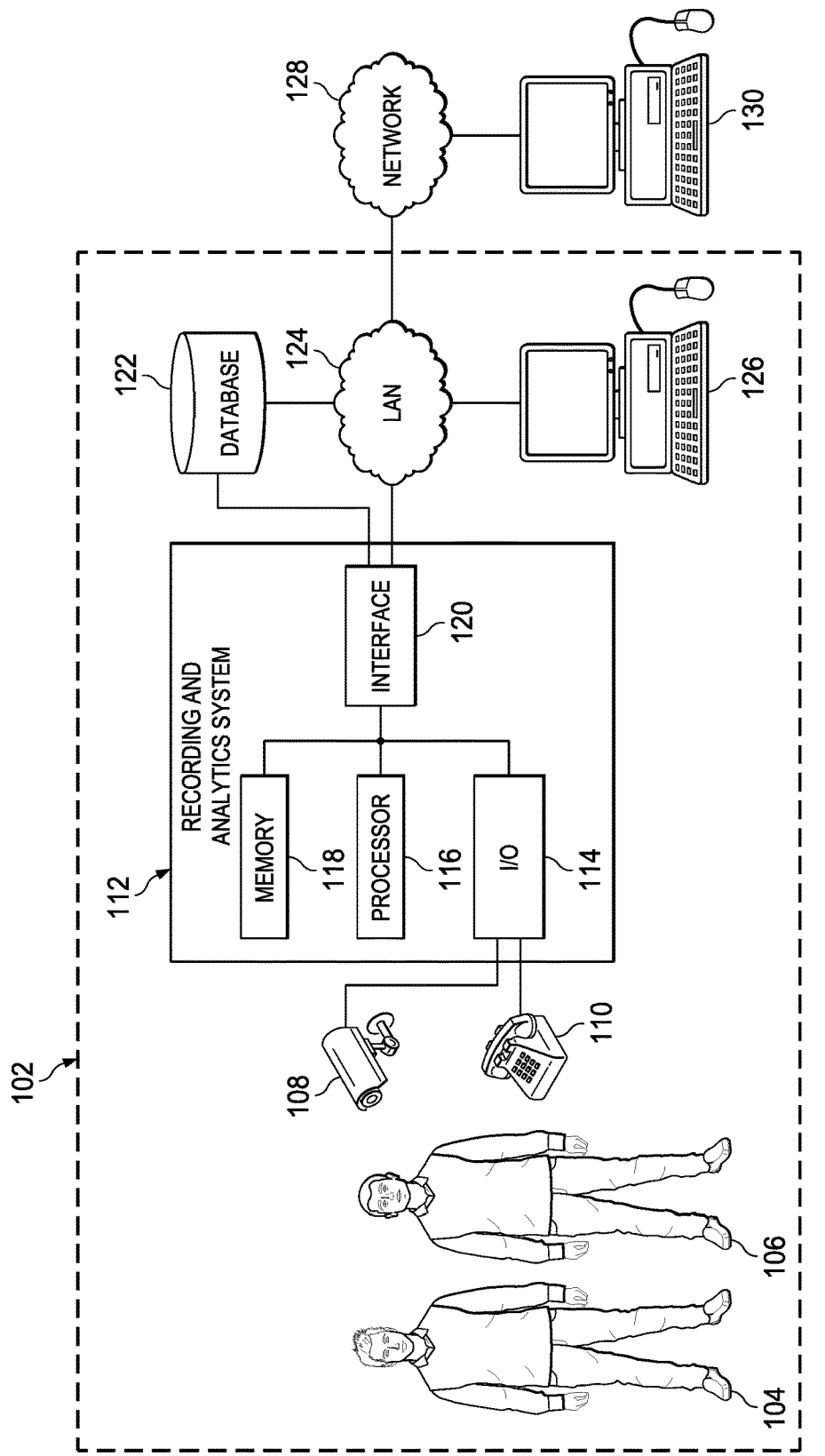

Having thus described some embodiments in general terms, reference will now be made to the accompanying drawings, which are not necessarily drawn to scale, and wherein:

FIG. 1 is a diagrammatic illustration of an example recording and analysis environment in accordance with some embodiments.

Figure 2:
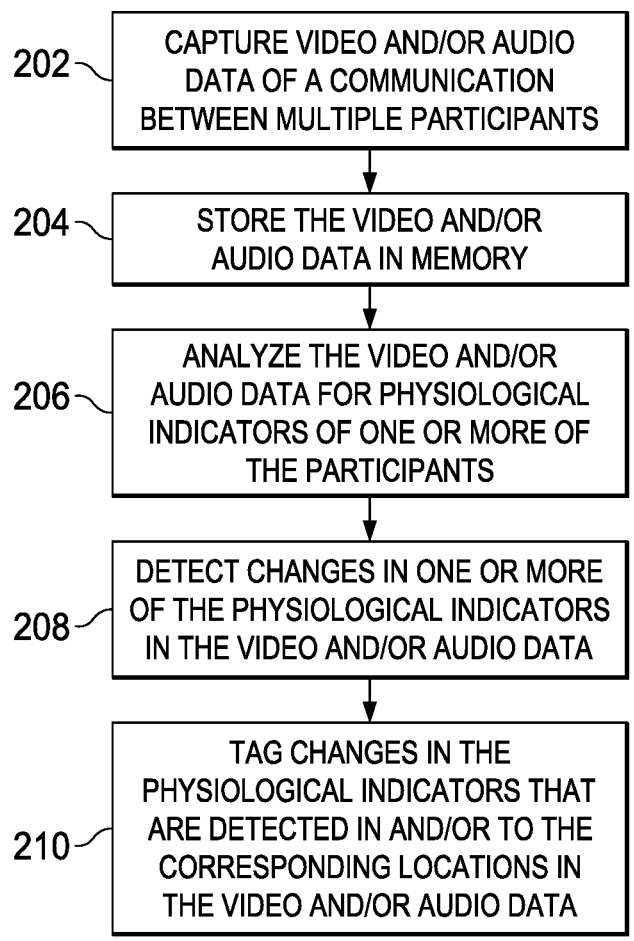

FIG. 2 is a flowchart of example implementation of a process for detecting a change of a physiological indicator of a participant to a communication and within video and/or audio data and tagging the video and/or audio data to indicate where the change occurred, in accordance with some embodiments of the present systems and methods.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

Some embodiments now will be described more fully hereinafter with reference to the accompanying drawings. Embodiments may take many different forms and should not be construed as limited to the disclosure set forth herein. Rather, these embodiments herein are provided so that this disclosure will be thorough and complete, and will fully convey the scope of the invention to those skilled in the art. One skilled in the art may be able to use the various embodiments of the invention.

Some embodiments described herein relate generally to the detection of a possible event based on physiological indicators of participants in a communication in video and/or audio data, and to the tagging of the possible event and/or physiological indicators in and/or to the video and/or audio data. Some embodiments are described with reference to communications made in and/or originating from a controlled-environment facility. However, other embodiments can be applied to any monitored communication in any environment. The detecting and tagging of physiological indicators and/or a possible event based on the physiological indicators can allow for increased information in a subsequent investigation or data mining effort, or for more effective interrogations in an investigation, for example.

Various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like. For convenience of explanation, various examples discussed herein are presented in the context of correctional facilities, or the like. For instance, in some of the embodiments discussed below, an example of a controlled-environment facility may be a correctional facility, jail or prison, and its residents may be referred to as inmates, arrestees, or detainees. It should be understood, however, that the systems and methods described herein may be similarly applicable to other types of controlled-environment facilities and their respective residents (e.g., a hospital and its patients, a school dormitory and its students, etc.).

FIG. 1 is a diagrammatic illustration of an example recording and analysis environment in accordance with some embodiments. The illustration shows a controlled-environment facility 102, which may be a correctional facility like a jail or prison. A first person 104 and a second person 106 are shown within the controlled-environment facility 102. The first person 104 may be a resident (e.g., inmate) of the controlled-environment facility 102, and the second person 106 may be an investigator, a family member, a friend, or another. The first person 104 and the second person 106 may be communicating, such as by way of interrogation during an investigation, face-to-face personal visitation, or indirect communications such as telephone calls, video conferencing, or the like.

The controlled-environment facility 102 includes a video camera 108, an audio device 110, a recording and analytics system 112, a database device 122, a network (e.g., local area network (LAN)) 124, and a terminal 126. This may be in the form of any reporting device such as a video terminal or other sensory feedback device. In some embodiments, the audio device 110 is a microphone. The video camera 108 and audio device 110 can be incorporated into one packaged device to capture video data and audio data, in some embodiments, and in other embodiments, the audio device 110 is separate from the video camera 108. In some embodiments, the video camera 108 includes an infrared detector for capturing infrared radiation, which may be in addition to a camera for capturing visible light spectrum radiation. In other embodiments, the video camera 108 captures only video images. In some embodiments, the audio device 110 may be an observation point (e.g., wire-tap) in a connection between telephones, such as when a resident is communicating to a non-resident through telephones (e.g., on opposite sides of a glass or by remote communication).

As illustrated, the recording and analytics system 112, which may be referred to as a computing system, includes one or more input/output (I/O) interface(s) 114, one or more processor 116, memory 118, and one or more network interface card(s) 120 coupled together, e.g., through a bus. The I/O interface(s) 114 is coupled to one or more input/output devices, which in this example include video camera 108 and audio device 110.

In some embodiments, I/O interface(s) 114 may be configured to coordinate I/O traffic between processor 116, memory 118, and any peripheral devices in the device, including network interface card(s) 120 or other peripheral interfaces. I/O interface(s) 114 may perform any suitable protocol, timing or other data transformations to convert data signals from one component (e.g., video camera 108 and/or audio device 110) into a format usable by another component (e.g., processor 116). I/O interface(s) 114 may include support for devices attached through various types of peripheral buses, such as a variant of the Peripheral Component Interconnect (PCI) bus standard or the Universal Serial Bus (USB) standard, for example. In some embodiments, the function of I/O interface(s) 114 may be split into two or more separate components, such as a north bridge and a south bridge, for example. In addition, some or all of the functionality of I/O interface(s) 114, such as an interface to memory 118, may be incorporated into processor 116.

In various embodiments, the recording and analytics system 112 may be a single-processor system including one processor 116, or a multi-processor system including two or more processors 116 (e.g., two, four, eight, or another suitable number). Processor 116 may be any processor capable of executing program instructions. For example, in various embodiments, processor 116 may be a general-purpose or embedded processor implementing any of a variety of instruction set architectures (ISAs), such as the x86, POWERPC®, ARM®, SPARC®, or MIPS® ISAs, or any other suitable ISA. In multi-processor systems, each of processors 116 may commonly, but not necessarily, implement the same ISA.

Memory 118 may be configured to store program instructions and/or data accessible by processor 116. In various embodiments, memory 118 may be implemented using any suitable tangible or non-transitory storage memory, such as static random access memory (SRAM), synchronous dynamic RAM (SDRAM), nonvolatile/Flash-type memory, or any other type of memory. As illustrated, program instructions and data implementing certain operations, such as, for example, those described below, may be stored within memory 118 as program instructions and data storage, respectively. In other embodiments, program instructions and/or data may be received, sent or stored upon different types of computer-accessible media or on similar media separate from memory 118 or the recording and analytics system 112. Generally speaking, a computer-readable medium may include any tangible or non-transitory storage media or memory media such as magnetic or optical media—e.g., disk or CD/DVD-ROM coupled to the recording and analytics system 112 via I/O interface(s) 114, Flash memory, random access memory (RAM), etc. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via one or more network interface cards 120.

The recording and analytics system 112 can operate a recording module and an analytics module on the processor 116. The recording module and the analytics module may each include program code instructions stored on the memory 118 or other tangible, non-transitory memory that when operated on the processor 116 performs one or more specific tasks, such as tasks described below. The recording module and the analytics module may each include additional sub-modules and/or one or more routines. In some embodiments, the recording module and the analytics module may be part of a single program, routine, function, or the like, or may be separate programs, routines, functions or the like.

Network interface card 120 may be configured to allow data to be exchanged between the recording and analytics system 112 and another device directly coupled to the recording and analytics system 112, or between the recording and analytics system 112 and other devices attached to a network (e.g., LAN 124), such as other computer systems. In various embodiments, network interface card 120 may support communication via wired or wireless general data networks, such as any suitable type of Ethernet network, for example; via telecommunications/telephony networks such as analog voice networks or digital fiber communications networks; via storage area networks such as Fibre Channel storage-area networks (SAN), or via any other suitable type of network and/or protocol.

The database (DB) device 122, operating a database with an appropriate database management system (DBMS), is coupled to the recording and analytics system 112 (e.g., using network interface card 120) and the LAN 124, for example, using one or more interface card (not specifically shown). The database device 122 can include one or more processor for operating the DBMS, system memory for storing program instructions of the DBMS, and database memory for storing the database. A processor in the database device 122 may be any processor capable of executing program instructions. For example, in various embodiments, processors may be general-purpose or embedded processors implementing any of a variety of ISAs, such as the x86, POWERPC®, ARM®, SPARC®, or MIPS® ISAs, or any other suitable ISA. In multi-processor systems, each of processors may commonly, but not necessarily, implement the same ISA. System memory of the database device may be configured to store program instructions and/or data accessible by processor. In various embodiments, system memory may be implemented using any suitable tangible or non-transitory memory medium. Program instructions and data implementing certain operations, such as, for example, the DBMS, may be stored within system memory as program instructions and data storage, respectively. In other embodiments, program instructions and/or data may be received, sent or stored upon different types of computer-accessible media or on similar media separate from system memory or the database device 122. Generally speaking, a computer-readable medium may include any tangible or non-transitory storage media or memory media. The DBMS may be structured query language (SQL)-based, IBM DB2, or the like. The database can be stored in any acceptable memory technology, such as redundant array of independent disks (RAID) or the like.

The recording and analytics system 112 and the database device 122 are coupled to the LAN 124, e.g., through network interface card(s) 120 in the recording and analytics system 112 and interface cards (not specifically illustrated) in the database device 122. The LAN 124 may be a wired and/or wireless network. A first terminal 126 is also coupled to the LAN 124 by, e.g., a wired and/or wireless connection. The first terminal 126 can be, for example, a computer, laptop, tablet, smartphone, or other device that can receive data, such as by querying the database of the database device 122. The LAN 124 is coupled to a network (e.g., wide area network (WAN), the Internet, or the like) 128 that extends outside of the controlled-environment facility 102. A second terminal 130 is also coupled to the network 128 by, e.g., a wired and/or wireless connection. The second terminal 130 can be, for example, a computer, laptop, tablet, smartphone, or other device that can receive data, such as by querying the database of the database device 122.

A person of ordinary skill in the art will also appreciate that the above-discussed computer systems (e.g., recording and analytics system 112 and database device 122) are merely illustrative and are not intended to limit the scope of the disclosure described herein. In particular, the computer systems and devices may include any combination of hardware or software that can perform the indicated operations. Additionally, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

FIG. 2 is a flowchart of example implementation of a process for detecting a change of a physiological indicator of a participant to a communication and within video and/or audio data and tagging the video and/or audio data to indicate where the change occurred in accordance with some embodiments of the present systems and methods. The process of FIG. 2 is discussed below as operating in the context of the system of FIG. 1, as illustrated. One of ordinary skill in the art will readily understand that the method of FIG. 2 may operate in other environments and systems, such as in modifications of FIG. 1 discussed above or other environments and systems.

In step 202, video and/or audio data of a communication between multiple participants is captured by a video camera and/or audio device. In some embodiments, the video and/or audio data is of a communication between multiple people, such as the first person 104 and second person 106. In the context of FIG. 1, the video camera 108 captures video data of the communication between the first person 104 and second person 106, and the audio device 110 captures audio data of the communication between the first person 104 and second person 106.

In some embodiments, the communication can be a face-to-face communication (e.g., an interrogation or other visitation) where the second person 106 is communicating with the first person 104. In some situations, for example, the video camera 108 can be focused on the first person 104, without capturing images of the second person 106, while in other situations, the video camera 108 can capture images of the first person 104 and the second person 106. The audio device 110 can be, e.g., a microphone to capture the audio between the first person 104 and the second person 106.

In some embodiments, the communication can be indirect (e.g., through a telephone, video conference, or the like) where the first person 104 is located on-site at the controlled-environment facility 102 and the second person 106 can be on-site or remote from the controlled-environment facility 102. In some instances, the video camera 108 can be focused on the first person 104 to capture images of only the first person 104, such as when the second person 106 is remote from the controlled-environment facility 102, and in other instances, the video camera 108 can capture images of the first person 104 and the second person 106, such as when both the first person 104 and the second person 106 are on-site at the controlled-environment facility 102. The audio device 110 can be, for example, a component of a device used in the indirect communication, and the audio data can be captured using, for example, a wire-tap.

In step 204, the video and/or audio data is stored in memory. In some instances, the video and/or audio data may be stored directly into memory. In other instances, the video and/or audio data may be formatted, or re-formatted, for storage. In the context of FIG. 1, video data is received at the recording and analytics system 112 from the video camera 108, and audio data is received at the recording and analytics system 112 from the audio device 110. This data is received at the recording and analytics system 112 using the I/O interface 114. The data, using the recording module of the recording and analytics system 112 operating on the processor 116, may be temporarily stored in a cache in memory 118, where it is subsequently accessed by the recording module operating on the processor 116 for formatting for storage. After formatting the data, the recording module operating on the processor 116 transmits the data through the network interface card 120 to the database device 122 for storage in the database. The format of the video and/or audio data may be any acceptable format.

In step 206, the video and/or audio data is analyzed for physiological indicators of one or more of the participants. The analysis can be performed in substantially real-time as the video and/or audio data is received, and/or after the video and/or audio data has been stored in memory. The physiological indicators can include heart rate, blood pressure, breathing rate, unconscious expressions, body temperature, speaking volume, speaking rate, voice frequency, or the like.

The physiological indicators can be detected through the video and/or audio data using any acceptable technique. In some embodiments, heart rate, blood pressure, breathing rate, and body temperature can be detected as described in U.S. Pat. No. 8,965,090 to Khachaturian et al., issued on Feb. 24, 2015, and entitled "Non-Touch Optical Detection of Vital Signs," the disclosure of which is hereby incorporated herein in its entirety. In some embodiments where body temperature may be detected, an infrared detector may be used to detect a body temperature. In some embodiments, unconscious expressions can be detected using any acceptable object recognition and tracking algorithm for processing video data, and in some embodiments, speaking volume, speaking rate, and voice volume can be detected using any acceptable speech processing algorithm for processing audio data.

In the context of the system of FIG. 1, the analytics module of the recording and analytics system 112 operating on the processor 116 performs the detection of the physiological indicators in some embodiments. The analytics module may access the video and/or audio data from a cache in memory 118 and/or from the database operating on the database device 122. The analytics module may then perform algorithms upon the video and/or audio data to detect the physiological indicators of one or more of the participants of the communication.

In step 208, changes in one or more of the physiological indicators are detected in the video and/or audio data. For example, a baseline of a given physiological indicator can be provided, and a variation from the baseline of that physiological indicator can be determined from the video and/or audio data. The baseline can be determined by analyzing the video and/or audio data. Alternatively, the baseline may be set at a predefined threshold. For example, an average measurement of a physiological indicator can be determined and used as the baseline for that indicator. The average measurement may be determined from a portion of, or the entirety of, the video and/or audio data if the video and/or audio data is analyzed after recording the entirety of the video and/or audio data, or determined as a running average of the video and/or audio data if the video and/or data is analyzed in real-time. In some embodiments, any change from a baseline is detected, and in some embodiments, any change that is thought to be statistically significant can be detected, such as a change that exceeds a given threshold for a particular physiological indicator. In the context of the system of FIG. 1, the analytics module can, after detecting the physiological indicators, determine whether a change of the physiological indicators has occurred in the video and/or audio data.

In step 210, changes in the physiological indicators that are detected are tagged in and/or to the corresponding locations (e.g., times) in the video and/or audio data where the changes were detected. In some embodiments, the tag is stored within the data structure of the video and/or audio data, and in some embodiments, the tag is stored in another data structure with an indicator (e.g., pointer) of where in the video and/or audio data the change occurred. The tag can also include an indication of a duration that the physiological indicator was in the detected state, such as by including an ending location (e.g., time) of the data. The tag can include an indication of which physiological indicator had the change that was detected (e.g., by keywords) and information relating to the change of the physiological indicator (e.g., an amount of variation from the baseline for that physiological indicator). In the context of the system of FIG. 1, the analytics module can store tags in the memory 118 and/or the database operating on the database device 122.

Once the analytics module completes the analysis of the video and/or audio data, the video and/or audio data and the tags are stored in the database operating on the database device 122 and/or other tangible, non-transitory memory medium. This information can be stored in any acceptable data structure. A user, such as at one of the terminals 126 and 130, can access and/or query this information for subsequent investigations and/or data mining. This ability can allow authorities to determine the veracity of people being interviewed, new jargon or coded language used by inmates to avoid detection of illicit communications, or the like.

With the tags, a user, such as at one of the terminals 126 and 130, can query the database operating on the database device 122 to access relevant video and/or audio data based on the tags. For example, the user can identify a specific tag, and be directed to the beginning of the video and/or audio data where the change(s) in physiological indicators occurred (or earlier to gain context of the change(s)) to review what happened in the video and/or audio data. This indexing can allow for more efficient searches and identification of information within video and/or audio data.

Additionally, in some embodiments, if the change(s) of physiological indicators is output to a user, the output can be, for example, real-time feedback that can aid an interrogation. For example, if the interrogator is informed that the person being interviewed is exhibiting changes of physiological indicators that show that the person is possibly lying or stressed, the interrogator can more readily address the pertinent issues to determine what is likely causing the person to give the deception or to be stressed.

Further, tags can be correlated to determine if there was a possible emotional change or other occurrence that occurred within the video and/or audio data that is based on the physiological indicators. For example, a change in one physiological indicator may not necessarily be indicative of a possible emotional change or other occurrence; however, in some instances, a combination of multiple physiological indicator may indicate a possible event, such as one of the participants is possibly lying, is possibly stressed, is possibly angry, etc. Various combinations of physiological indicators may be predefined as indicative of a possible emotional change or other occurrence, and these predefined combinations can be compared with the tags in and/or to a particular location (e.g., time) of the video and/or audio data to determine if the combination of tags at that location are indicative of a possible emotional change or other occurrence in the video and/or audio data.

Such an indication of a possible emotional change or other occurrence that occurred in the video and/or audio data can be stored to memory and/or output to a user. If the indication is stored to memory, in some embodiments, the possible emotional change or other occurrence may be stored within the data structure of the video and/or audio data to indicate where the possible emotional change or other occurrence occurred within the video and/or audio data, and in some embodiments, the possible emotional change or other occurrence may be stored in another data structure with an indicator (e.g., pointer) of where in the video and/or audio data the possible emotional change or other occurrence occurred within the video and/or audio data.

In an example application, an audio/video recording of an inmate in a correctional facility may be analyzed. The audio/video recording may be captured during an interaction, such as an interview, interrogation, visitation, or other interaction with staff, faculty, inmates, peers, friends, family, or others. The audio/video recording of the interaction may be captured openly or discreetly and the fact of the recording may be known or unknown to the inmate. The audio/video recording may be captured from discrete recording equipment, such as illustrated in FIG. 1, or captured from electronic communications, such as telephone calls, video conferences, video visitations, or the like. The audio of such an interaction may be analyzed in real-time or after completion.

The audio content of the interaction can be analyzed to detect changes in overall and individual voice volumes and speaking rates. Baseline voice volumes and speaking rates may be established using a predetermined threshold or by calculating an average voice volume and speaking rate from the interaction. The voice volumes and speaking rates may be determined using a speech processing algorithm for processing audio data. Such algorithms may detect and analyze the occurrence (e.g., rate and duration) of vowel sounds, consonant sounds, and/or silences. Once a baseline has been determined, a trigger threshold may be set to detect occurrences of speech volume and/or rate that exceed the baseline by a certain amount. These occurrences may be tagged or bookmarked in the audio/video recording. Additionally, the rate of changes in the voice volume and/or speech rate may be used to detect occurrences of interest. For example, if a participant's speech increases rapidly, but does not exceed a threshold, such an occurrence may be tagged or bookmarked in the audio/video recording. An investigator may then quickly review events of potential interest in the audio/video recording of the interaction by studying occurrences that have been tagged or bookmarked.

Similarly, the video content of the interaction can be analyzed to detect changes in overall and individual movements or physical conditions of the participants. For example, a participant may move their arms, hands, or body while talking or they may move or fidget in their seat. A baseline level of such movements may be established using a predetermined threshold or by determining an average amount of movement during the interaction. The movement of the participant may be determined by measuring changes in the participant's location relative to a reference point. Similarly, facial expressions may be detected during the interaction. Physiological parameters, such as heart rate, blood pressure, breathing rate, or body temperature, may be detected and recorded contemporaneously with the audio/video recording or may be measured or inferred from changes in the participant's body in the audio/video recording. Once a baseline has been determined, a trigger threshold may be set to detect occurrences of body movement or physiological parameters that exceed the baseline by a certain amount. These occurrences may be tagged or bookmarked in the audio/video recording. An investigator may then quickly review events of potential interest in the audio/video recording by studying occurrences that have been tagged or bookmarked for excessive movement or changes in physiological parameters.

In the context of FIG. 1, the analytics module can store a possible emotional change or other occurrence in the memory 118 and/or the database operating on the database device 122. These occurrences may be stored as tags or bookmarks in an audio/video recording file or may be stored as a separate file that references times of interest in the audio/video recording. The tags or bookmarks may specifically label each occurrence (e.g., loud speech, fast speech, excessive movement) or may generally indicate that some event occurred.

The audio/video recording along with the tag or bookmark file may be transmitted from the analytics module to a user on the first terminal 126, e.g., through network interface card 120 and LAN 124, and/or to a user on the second terminal 130, e.g., through network interface card 120, LAN 124, and network 128. The user, such as an investigator, may analyze the events highlighted by the tags or bookmarks.

Stored tag or bookmark data can be accessed for subsequent investigations, data mining, or the like. In some embodiments, audio/video analytics may be performed by a self-contained processor that receives the audio/video recording via a bus or portable memory device (e.g. a USB flash drive or memory stick, digital versatile disk (DVD), etc.) instead of requiring a direct or remote connection over a LAN.

In some embodiments if the possible change of state is output to a user, the output can be, for example, real-time feedback that can aid, for example, an interrogation.

Although the present embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from this disclosure, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   using an analytics module operating on at least one processor:
   receiving a recorded conversation between participants;
   detecting a physiological indicator of a participant by analyzing the recorded conversation;
   determining a change in the physiological indicator of the participant during the recorded conversation; and
   tagging a location in the recorded conversation where the change in the physiological indicator occurred in the recorded conversation, the tagging including storing a tag indicating the location in the recorded conversation where the change in the physiological indicator occurred.

2. The method of claim 1, wherein the recorded conversation includes a video of the recorded conversation.

3. The method of claim 1, wherein the recorded conversation includes an audio recording.

4. The method of claim 1 further comprising:
   using a recording module operating on at least one processor:
   receiving the recorded conversation from a video-capturing device, an audio-capturing device, or a combination thereof; and
   storing the recorded conversation in a database operating on a database device.

5. The method of claim 1, wherein the physiological indicator includes heart rate, blood pressure, breathing rate, facial expressions, body temperature, speaking volume, speaking rate, voice frequency, or a combination thereof.

6. The method of claim 1 further comprising, using the analytics module, transmitting an indication of the change in the physiological indicator to a terminal in real-time with the recording of the conversation, a user having access to the terminal during the recording of the conversation.

7. The method of claim 1, wherein the determining the change in the physiological indicator includes:
   determining a baseline of the physiological indicator from the recorded conversation; and
   determining when the physiological indicator deviates from the baseline during the recorded conversation.

8. The method of claim 1, wherein the determining the change in the physiological indicator includes:
   determining a baseline of the physiological indicator from the recorded conversation; and
   determining when the physiological indicator deviates from the baseline in the recorded conversation by at least a threshold value.

9. The method of claim 1, wherein the tag includes a label describing the determined change in the physiological indicator.

10. The method of claim 1, wherein the tag includes a keyword indicative of the physiological indicator.

11. A system comprising:
    a database device having a database management system operable on at least one processor and having a database memory for storing a database; and
    an analytics system having an analytics module operable on at least one processor, the analytics system being operatively coupled to the database device, the analytics module being operable to receive communications data representative of a recorded conversation between at least two participants, the recorded conversation including video data, audio data, or a combination thereof, the analytics module further being operable to identify a physiological indicator of a participant in the recorded conversation, operable to determine a change in the physiological indicator of the participant in the recorded conversation, and operable to transmit a tag to the database device, the tag indicating a location in the recorded conversation where the change in the physiological indicator occurred, the database management system being operable to store the recorded conversation and the tag in the database memory.

12. The system of claim 11 further comprising:
an audio device operatively coupled to the analytics system, the audio device operable to capture the audio data of the recorded conversation; and
a video device operatively coupled to the analytics system, the video device operable to capture the video data of the recorded conversation.

13. The system of claim 12, wherein the video device further includes an infrared detector.

14. The system of claim 11, wherein the analytics system further has a recording module operable on at least one processor, the recording module being operable to transmit the recorded conversation to the database device for storing the recorded conversation in the database.

15. The system of claim 11 further comprising a terminal operatively coupled to the analytics system, the analytics module being operable to transmit an indication of the change to the terminal in real-time during the recording of the conversation between the participants.

16. A non-transitory computer-readable storage medium having a computer program embodied thereon, the computer program comprising:
program code instructions for detecting a physiological indicator of a participant in a recorded conversation, the recorded conversation including video data, audio data, or a combination thereof;
program code instructions for determining a change in the physiological indicator of the participant during the recorded conversation; and
program code instructions for storing the recorded conversation and a tag to memory, the tag indicating a location in the recorded conversation where the change in the physiological indicator occurred.

17. The non-transitory computer-readable storage medium of claim 16, wherein the tag includes a label describing the determined change in the physiological indicator.

18. The non-transitory computer-readable storage medium of claim 16, wherein the physiological indicator includes heart rate, blood pressure, breathing rate, facial expressions, body temperature, speaking volume, speaking rate, voice frequency, or a combination thereof.

19. The non-transitory computer-readable storage medium of claim 16, wherein the program code instructions for determining the change in the physiological indicator comprises:
program code instructions for determining a baseline of the physiological indicator from the recorded conversation; and
program code instructions for determining when the physiological indicator deviates from the baseline in the recorded conversation by at least a threshold value.

20. The non-transitory computer-readable storage medium of claim 16, wherein the tag further includes a keyword indicative of the physiological indicator.

* * * * *